United States Patent
Lostedt

(10) Patent No.: US 12,374,805 B2
(45) Date of Patent: Jul. 29, 2025

(54) ADDITIVELY MANUFACTURED SEMI-CONVEX MMWAVE ANTENNA

(71) Applicant: Telefonaktiebolaget LM Ericsson (publ), Stockholm (SE)

(72) Inventor: Mikael Lostedt, Glumslöv (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 149 days.

(21) Appl. No.: 18/549,196

(22) PCT Filed: Mar. 11, 2021

(86) PCT No.: PCT/SE2021/050214
§ 371 (c)(1),
(2) Date: Sep. 6, 2023

(87) PCT Pub. No.: WO2022/191748
PCT Pub. Date: Sep. 15, 2022

(65) Prior Publication Data
US 2024/0154321 A1    May 9, 2024

(51) Int. Cl.
*H01Q 1/36* (2006.01)
*B33Y 80/00* (2015.01)
(Continued)

(52) U.S. Cl.
CPC ......... *H01Q 21/0025* (2013.01); *H01Q 1/241* (2013.01); *H01Q 21/20* (2013.01)

(58) Field of Classification Search
CPC ............ H01Q 1/24; H01Q 1/241; H01Q 1/36; H01Q 15/16; H01Q 21/0025;
(Continued)

(56) References Cited

U.S. PATENT DOCUMENTS

2017/0237165 A1\* 8/2017 Ortiz ...................... H01Q 21/28
2020/0243957 A1\* 7/2020 Ueda ........................ H01Q 1/38
(Continued)

FOREIGN PATENT DOCUMENTS

| CN | 105406204 A | 3/2016 |
|---|---|---|
| CN | 107546495 A | 1/2018 |

(Continued)

OTHER PUBLICATIONS

Tang, Ming-Chun , et al., "Particle Swarm Optimized, 3-D-Printed, Wideband, Compact Hemispherical Antenna", IEEE Antennas and Wireless Propagation Letters, vol. 17, No. 11, Nov. 2018, 5 pages.
(Continued)

*Primary Examiner* — Thai Pham
(74) *Attorney, Agent, or Firm* — Murphy, Bilak & Homiller, PLLC

(57) ABSTRACT

An antenna apparatus comprises an additively manufactured body having a back surface with one or more flat regions and a substantially convex front surface opposite the back surface, as well as one or more of any of the following: a radiative antenna element attached to the front surface; a radiative antenna element integrated into or near the front surface via additive manufacturing; a passive electrical filter component integrated into the body via additive manufacturing; and an electrically conductive trace integrated into the body via additive manufacturing and arranged to provide an electrical connection from the back surface of the body to the front surface of the body or to a passive electrical filter component integrated into the body.

19 Claims, 3 Drawing Sheets

(51) Int. Cl.
    *H01Q 1/24*     (2006.01)
    *H01Q 21/00*     (2006.01)
    *H01Q 21/20*     (2006.01)

(58) Field of Classification Search
    CPC .... H01Q 21/0087; H01Q 21/20; H01Q 23/00; B33Y 30/00; B33Y 80/00

See application file for complete search history.

(56) References Cited

U.S. PATENT DOCUMENTS

| | | | | |
|---|---|---|---|---|
| 2021/0151855 | A1* | 5/2021 | Sikina | H01Q 21/065 |
| 2022/0294123 | A1* | 9/2022 | Sikina | H01Q 21/067 |

FOREIGN PATENT DOCUMENTS

| | | |
|---|---|---|
| CN | 109755760 B | 8/2020 |
| EP | 3048668 A1 | 7/2016 |

OTHER PUBLICATIONS

Bisognin, Aimeric, et al., "Ball Grid Array Module With Integrated Shaped Lens for 5G Backhaul/Fronthaul Communications in F-Band", IEEE Transactions on Antennas and Propagation, Dec. 2017, pp. 6380-6397.

Karki, Sumit, et al., "Metallic Monopole Parasitic Antenna with Circularly Polarized Conical Patterns", IEEE Transactions on Antennas and Propagation, vol. 67, No. 8, Aug. 2019, pp. 5243-5252.

Pavlenko, Tatiana, et al., "Design of Sparse Dome Antenna Array for Angle of Arrival Localization Systems", 13th European Conference on Antennas and Propagation (EuCAP 2019), Mar. 2019, 4 pages.

* cited by examiner

ADDITIVELY MANUFACTURED SEMI-CONVEX MMWAVE ANTENNA

TECHNICAL FIELD

This disclosure is generally related to antenna structures, and is more particularly related to antenna structures supporting antennas radiating in multiple directions to provide improved antenna coverage.

BACKGROUND

With the deployment of fifth-generation (5G) wireless technology, millions of access points are likely to be deployed, in addition to the tens of millions of end user wireless devices. Each of these devices will need improved antenna structures that support radio links using so-called millimeter-wave (mmW, or mmWave) frequencies, a term used generally to refer to radio frequencies above about 10 GHz. Today's mmWave multiantenna systems are typically integrated into or mounted on printed circuit boards (PCBs) or other flat substrates, which then have active components mounted on the flat backside. Depending on the specifics of the antenna design, the antenna coverage arc provided by such structures may be as much as about 120 degrees.

For indoor systems or other deployments where, for example, ensuring coverage of a small room at all angles from a radiating and/or receiving device is more important than extending reach, a 120° coverage provided by a flat antenna surface is too limited. For a wall mounted antenna structure, for example, 180° coverage would be required in order to cover all areas within the confined space. Accordingly, improved antenna structures are needed.

SUMMARY

The techniques and devices described herein address the above and other problems by providing an asymmetric substrate for antennas, this asymmetric substrate having one convex side (e.g., semi-spheroidal or semi-cylindrical) and an opposite flat side. This substrate is formed using additive manufacturing (e.g., 3D-printing), whereby the substrate is formed one thin layer at a time. In some embodiments, the substrate or "body" formed by this additive may also include integrated filters and cooling features for the radio front end, which may comprise one or more radio application-specific integrated circuits (ASICs) mounted on the flat back side of the substrate.

An example antenna apparatus according to some of the embodiments described herein comprises an additively manufactured body having a back surface with one or more flat regions and a substantially convex front surface opposite the back surface, as well as one or more of any of the following: a radiative antenna element attached to the front surface; a radiative antenna element integrated into or near the front surface via additive manufacturing; a passive electrical filter component integrated into the body via additive manufacturing; and an electrically conductive trace integrated into the body via additive manufacturing and arranged to provide an electrical connection from the back surface of the body to the front surface of the body or to a passive electrical filter component integrated into the body.

Also disclosed herein are methods for constructing an antenna apparatus, an example of which comprises the step of additively manufacturing a body having a back surface with one or more flat regions and a substantially convex front surface opposite the back surface. This example also comprises forming, while additively manufacturing the body, one or more of one or more of the following: a radiative antenna element integrated into or near the front surface via additive manufacturing; a passive electrical filter component integrated into the body via additive manufacturing; and an electrically conductive trace integrated into the body via additive manufacturing and arranged to provide an electrical connection from the ack surface of the body to the front surface of the body or to a passive electrical filter component integrated into the body.

An advantage of several of the disclosed embodiments is that by enabling a convex PCB or similar substrate for mounting or integrating antenna structures, the angular coverage of the antennas can be extended up to 180° (or more) in a cost-efficient manner, while still allowing tight integration of active components on the flat back side.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
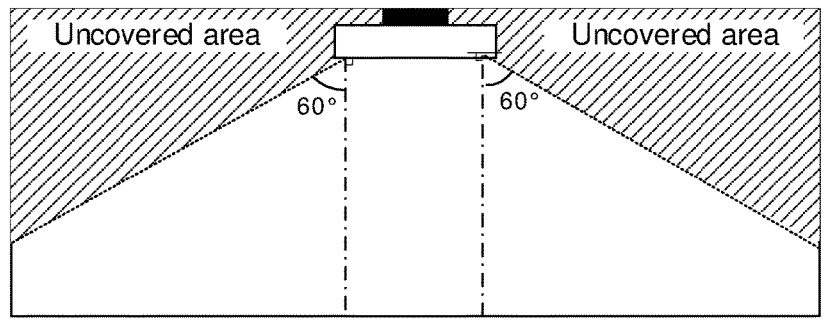
FIG. 1 illustrates coverage from a conventional, flat antenna structure.

As briefly discussed above, for indoor systems or other deployments where, for example, ensuring coverage of a small room at all angles from a radiating and/or receiving device is more important than extending reach, a 120° coverage provided by a flat antenna surface is too limited. This is illustrated in FIG. 1, which may be viewed as an overhead view of a narrow room served by a wall-mounted antenna structure having antenna elements providing 120° coverage. As seen in the figure, substantial portions of the room are receiving inadequate coverage. For a wall mounted antenna structure in a scenario like this one, 180° coverage would be required to cover all areas within the confined space.

There is also a limitation of how densely antennas can be mounted on a flat surface. This not only impacts the number of antennas and sizes thereof but also cooling of the frontend. All of these issues may be particularly problematic for antenna structures intended for use in handheld wireless devices or other compact wireless devices. Still another problem with flat antenna surfaces on which multiple antenna elements are mounted or applied is that the lengths of electrical traces to antenna elements near the outer edges of the surface may be significantly longer than the trace lengths to those closer to the location of active ASIC components, which may often be mounted on the back side of the substrate to which the antenna elements are applied. This will result in imbalanced losses in feeding the antennas, as well as phase differences between signals transmitted by or received with these antenna elements.

Figure 2:
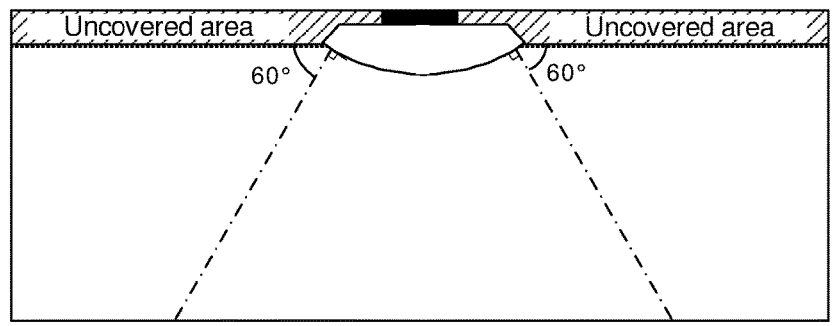
FIG. 2 illustrates coverage from an example antenna structure having a convex surface.

The techniques and devices address these issues by providing curved substrates on which antenna structures may be mounted or into which antenna structures may be fabricated. One advantage of these structures is that the antenna structures disposed in, near, or on the front surface are no longer limited to a planar arrangement, but may point in different directions, relative to a (flat) back side or mounting side of the substrate. This is illustrated generally in FIG. 2, which may be viewed as an overhead view of the same narrow room shown in FIG. 1. In the case of FIG. 2, however, the antenna structure mounted on the side wall has a curved, or convex, front surface with antenna elements deployed at various points on this curved front surface. Depending on the specific design of the antenna elements and the frequency range for which the antenna structure is designed, 3-dB coverage over 180 degrees may be obtained.

Additive manufacturing, e.g., 3D printing, provide the ability to build freely shaped printed circuit boards (PCBs) or similar substrate structures. Additive manufacturing can thus be employed to fabricate antenna structures having convex front faces, e.g., as shown in FIG. 2. In various embodiments, the additively manufactured structure may integrate passive electrical structures, such as electrically conductive traces or leads, or cavity filters, as well as thermal cooling structures. Some or all of these integrated structures may be formed by the additive manufacturing process.

Figure 3:
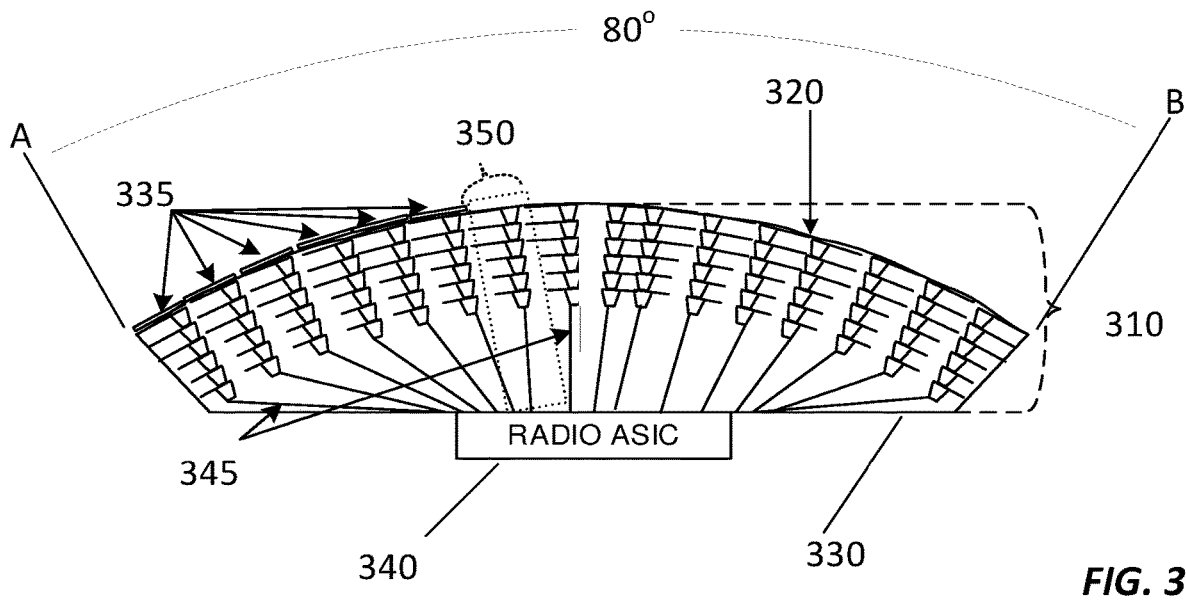
FIG. 3 illustrates an example antenna structure according to several embodiments as described herein.

These structures can be used to increase the antenna coverage sectors in multi-antenna systems, by integrating antenna elements on top of a convex shape. An example of this is shown in FIG. 3, which provides a cross-sectional view of an additively manufactured antenna structure. In the example shown in FIG. 3, the structure further integrates antenna coupling, filters and cooling, while still being able to mount supportive backside circuitry on a flat surface, as with a traditional PCB.

In more detail, the structure shown in FIG. 3 comprises an additively manufactured body 310, which has a convex surface 320, which might be regarded as the "front," and a flat surface 330 opposite the convex surface 320. Several radiative antenna elements 335 are disposed on or in the front surface 320. These might be formed in the body as part of the additive manufacturing process, e.g., by "3D-printing" metallic antenna elements, or formed on the convex surface 320 after the body is manufactured, or some combination of both, or mounted on the surface after the body is manufacture, or some combination of these three approaches. Note that while antenna elements may be referred to as "radiative" herein, it will be understood that an antenna element may radiate or receive, or both, in various applications—"radiative" here is simply meant to refer to a portion of an antenna that is designed to radiate or receive radio signals.

A radio ASIC 340 is mounted to the flat surface 330, opposite the convex surface 320. This flat surface may support electrical traces and other components mounted using, for example, conventional surface-mount PCB assembly techniques. This radio ASIC 340 may be electrically connected to the antenna elements 335 via conductive traces 345 passing through and/or on a surface of the body 310—it should be appreciated that because of the convex shape of the structure, the difference in length between the shortest and longest of these traces is considerably smaller than if the structure's top surface was flat. This allows for better matching of these traces in terms of their impedances and phase lengths.

In addition, integrated electrical filters 350, e.g., cavity filters, may be formed in the body 310 as part of the additive manufacturing process. Other passive electrical components, such as parallel plate capacitors and inductive traces may also be integrated; while the tolerances on the capacitances or inductances of these structures may be relatively large, depending on the additive manufacturing process and the materials in use, processes for applying material materials during an additive manufacturing process will improve, increasing the opportunities for including them in the antenna structures described herein.

In this disclosure, the terms "additive manufacturing," "additively manufactured," and the like refer to processes whereby an object is formed by iteratively adding or solidifying one layer of material onto a previous layer, typically under computer control based on a three-dimensional (3D) model of the desired object. Various materials may be used, including plastics and metallic materials. Several additive manufacturing processes are referred to as "3D printing," including, but not limited to, processes that utilize binder jetting, directed energy deposition, material extrusion, powder bed fusion, sheet lamination, and vat polymerization.

In this disclosure, the term "convex" means that an object has an outline or surface that is curved like the exterior of a circle or sphere. According to this definition, some objects with a convex surface may have a surface that is curved in only one plane, so that the curved surface on each of these objects forms a semi-cylinder, or semi-cylindroid. Other objects with a convex surface may have a surface that is curved in two orthogonal planes, so that the curved surface on each of these objects forms a semi-spheroid. Common to these and other objects having a convex surface is that each of these objects has at least one cross section having an outline where at least one portion of the outline is curved outwards, like the exterior of a circle.

Figure 4:
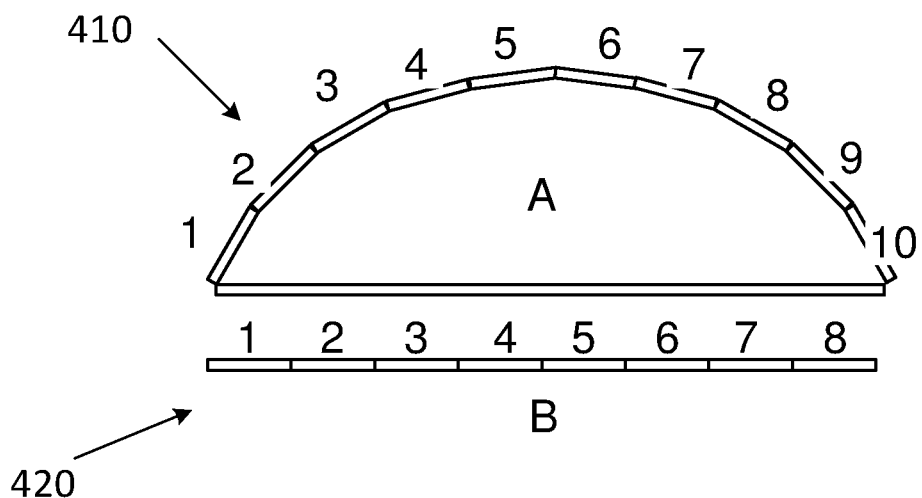
FIG. 4 illustrates an improvement in antenna surface area, according to some example embodiments.

It will be appreciated, of course, that the advantages of the antenna structures described herein may be achieved with structures where the curved surface is not perfectly smooth and/or does not have a curve that perfectly tracks the exterior of a circle. The term "substantially convex" is thus used herein to refer to surfaces that have an outline that approximates a convex curve in at least one cross-sectional plane. The outline of this surface may be segmented, such that it has several flat portions that are connected to roughly approximate a curve, or may have a curve that is generally outward, like the exterior of a circle or sphere, but that does not conform precisely to the shape of a circle, ellipse, sphere, or ellipsoid. (An example of a segmented convex surface is shown in FIG. 4, which is described in further detail below.) As a matter of general guidance, a particular surface may be regarded as "substantially convex" if lines perpendicular to the surface at or near opposite ends of the surface in at least one dimension have an angle between them of more than about 30 degrees, for example. In FIG. 3, examples of these lines are illustrated as lines A and B, which in this example have an angle between of approximately 80 degrees. Note that a substantially convex surface as described here need not necessarily extend to an end of the final object—a convex surface may be surrounded, partially or entirely, by a flat surface, in some embodiments.

An advantage of several of the disclosed embodiments is that by enabling a convex PCB or similar substrate for mounting or integrating antenna structures, the angular coverage of the antennas can be extended up to 180° (or more) in a cost-efficient manner, while still allowing tight integration of active components on the flat back side. Instead of using two or more separate flat antenna structures placed at angles with respect to another, a broad range of angular coverage can be provided with one structure, which will be more cost efficient and energy efficient, since it provides a more integrated solution.

Also, since the area of a convex structure is larger than a flat surface having the same footprint, it is also possible to include more antenna elements, which allows for a larger effective antenna area for both transmitting and receiving radio signals. This is shown conceptually in FIG. 4, which illustrates a semi-convex surface 410 made up of 10 flat segments. Below that is a flat surface 420, occupying the same horizontal footprint. If it is assumed that each of the flat segments in the semi-convex surface 410 is wide enough in the illustrated cross section to accommodate an antenna element, it can be seen that the flat surface 410 is only wide enough to accommodate eight such antenna elements, compared to the 10 that can fit across the semi-convex surface 410.

Further, trace-lengths for the radio front end from the antenna to radio circuitry may also be better matched with respect to impedance, since there will be less difference between the distances of the far most antenna elements at the edge in comparison with the more centrally place ones. As discussed above, it is also possible to integrate various types of small cavity filter structures for mmWave operation, and/or other passive electrical components and connections.

Still further, the added volume provided under the convex surface can be used for more efficient cooling of an antenna structure that includes, for example, a power amplifier. Some of this cooling is provided simply by the added mass of the structure. Additional cooling can be provided by forming a more hollow structure with heat fin structures and otherwise improved cooling flow for the radio front end. Channels through the structure, for liquid cooling, can also be formed during the additive manufacturing process.

Figure 5:
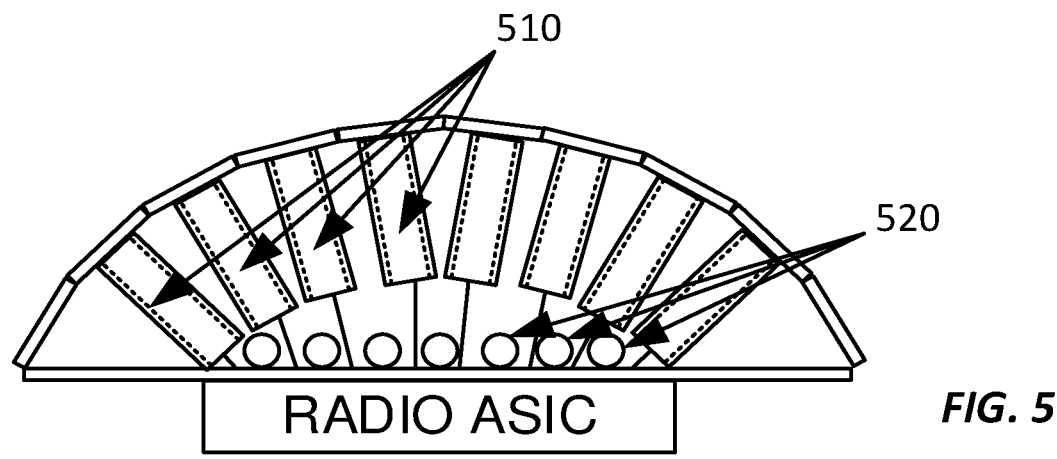
FIG. 5 illustrates an example structure with integrated cavity filters and cooling pipes.

FIG. 5 illustrates a cross-section of an example antenna structure in which additively manufactured cavity filters 510 are integrated, along with additively manufacture heat-pipes 520, which may be adapted to facilitate liquid cooling. Parts of the structure may be hollow, and the structure may include heat fins or other structures adapted to facilitate cooling to the air, in other embodiments. The material used for all or parts the supporting structure may be chosen (e.g., with respect to its thermal conductivity) to facilitate the structure acting as a heatsink and/or passive cooling device, in some embodiments.

Figure 6:
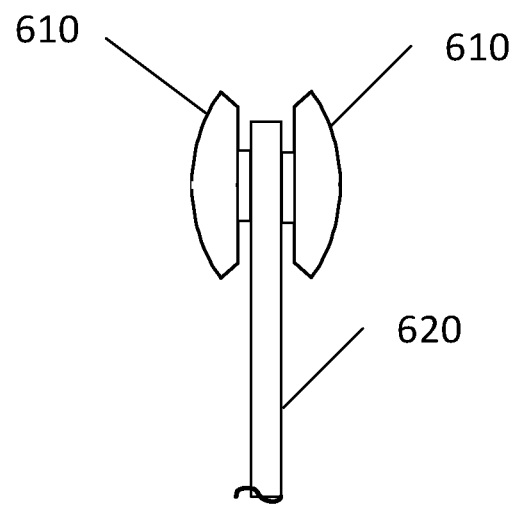
FIG. 6 illustrates an example circuit board assembly that includes two antenna structures as described herein.

Additively manufactured structures as described herein may be produced in a broad range of sizes, such as sizes suitable for mounting on a wall or pole, in association with a network access point. These structures may also be quite small such that they are suitable for integration into a wireless device (commonly referred to as a user equipment, or UE), e.g., by mounting the structures on a PCB that carries and connects various other electrical and electronics components of the wireless device. An example of this is shown in FIG. 6, which illustrates two semi-convex antenna structures 610 mounted on a PCB 620, which may be incorporated into a wireless handset or other UE.

In view of the discussion and examples provided below, it will be appreciated that embodiments of the techniques and apparatuses disclosed herein include an antenna apparatus that includes an additively manufactured body having a back surface with one or more flat regions and a substantially convex front surface opposite the back surface. Note that the terms "back" and "front" are used here and elsewhere in this document to refer to any pair of opposing surfaces, and do not imply any particular orientation of the device or structure. The apparatus further includes one or more of any of the following, in various embodiments: a radiative antenna element attached to the front surface; a radiative antenna element integrated into or near the front surface via additive manufacturing; a passive electrical filter component integrated into the body via additive manufacturing; and an electrically conductive trace integrated into the body via additive manufacturing and arranged to provide an electrical connection from the back surface of the body to the front surface of the body or to a passive electrical filter component integrated into the body. Some embodiments may include several of these types of integrated structures, while some may include all of them.

In some embodiments, the front surface is curved in one plane, so as to have a semi-cylindrical shape. In others, the front surface is curved in two orthogonal planes, so as to have a semi-spheroidal shape. Other profiles are possible.

Some embodiments comprise a plurality of antenna structures affixed to or integrated into or near the front surface, the antenna structures being arranged so as to collectively provide a radiation pattern having a 3-dB beamwidth greater than about 120 degrees in at least one plane orthogonal to the back surface. In some of these embodiments, the antenna structures are electrically connected to the back surface via electrical traces and/or passive electrical filter components integrated into the body via additive manufacturing.

Some embodiments may include at least one cavity filter integrated into the body via additive manufacturing. Some of these and other embodiments may include at least one heat pipe integrated into the body via additive manufacturing and configured to allow flow of liquid cooling through the body. Some embodiments may comprise at least one cooling fin structure integrated into the body via additive manufacturing.

Some embodiments of the example antenna apparatus described herein may further comprise one or more radio application-specific integrated circuits (ASICs) mounted on the back surface of the body. In some embodiments, one or more structures according to any of these examples may be mounted on a circuit board, to form a circuit board assembly.

Figure 7:
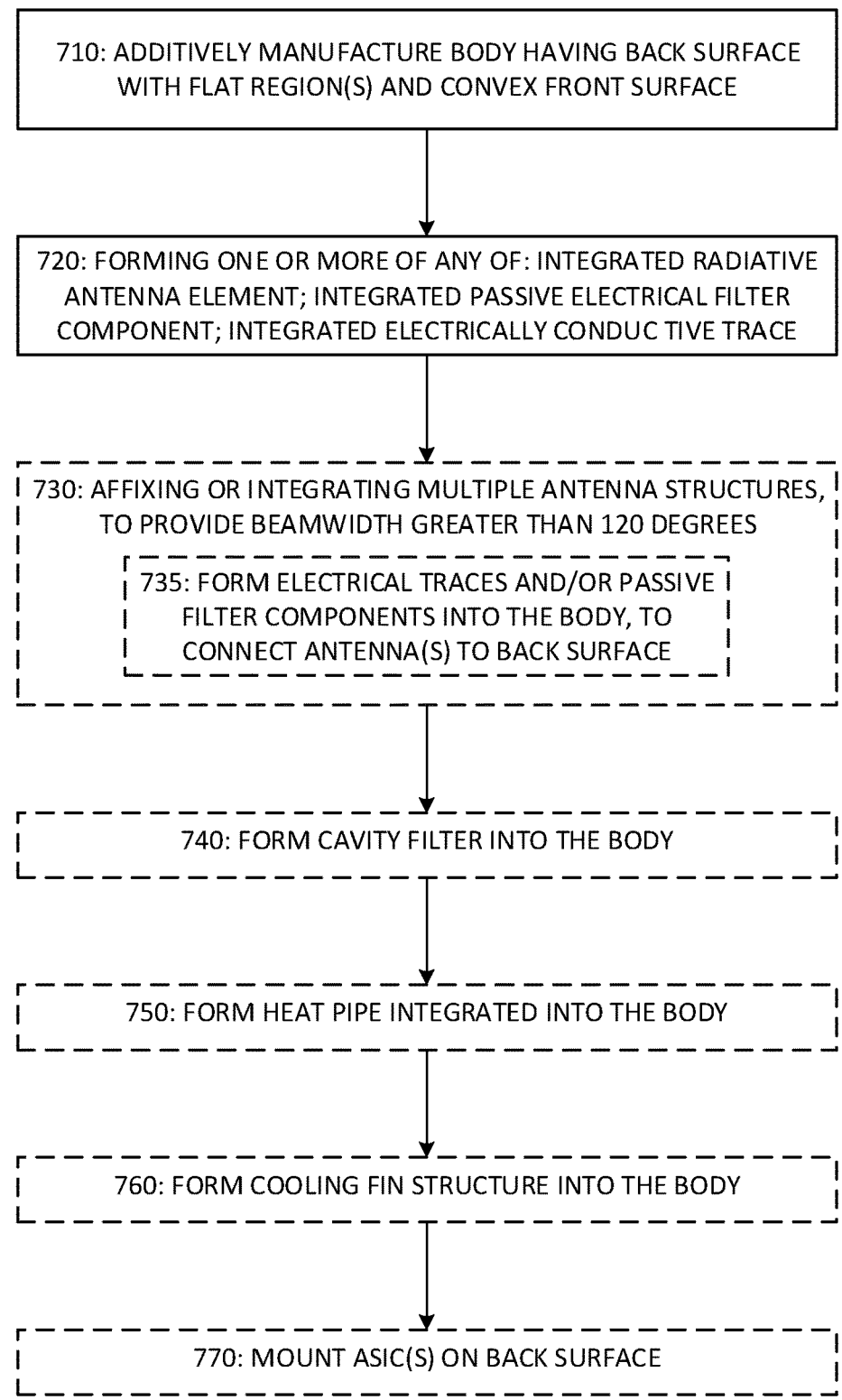
FIG. 7 is a process flow diagram illustrating an example method according to some of the embodiments described herein.

Corresponding to the apparatuses described above are methods for producing such apparatuses. An example method for constructing an antenna apparatus is illustrated in FIG. 7.

As shown at block 710, the method comprises additively manufacturing a body having a back surface with one or more flat regions and a substantially convex front surface opposite the back surface. As shown at block 720, the method further comprises forming, while additively manufacturing the body, one or more of one or more of the following: a radiative antenna element integrated into or near the front surface via additive manufacturing; a passive electrical filter component integrated into the body via additive manufacturing; and an electrically conductive trace integrated into the body via additive manufacturing and arranged to provide an electrical connection from the back surface of the body to the front surface of the body or to a passive electrical filter component integrated into the body.

In some embodiments, additively manufacturing the body may comprise forming the front surface to be curved in one plane, so as to have a semi-cylindrical shape. In other embodiments, additively manufacturing the body comprises forming the front surface to be curved in two orthogonal planes, so as to have a semi-spheroidal shape.

In some embodiments, the method may comprise affixing a plurality of antenna structures to the front surface or integrating a plurality of antenna structures into or near the front surface via additive manufacturing, so that the antenna structures are arranged so as to collectively provide a radiation pattern having a 3-dB beamwidth greater than 120 degrees in at least one plane orthogonal to the back surface. This is shown at block 730. In some of these embodiments, the method may further comprise forming electrical traces and/or passive electrical filter components integrated into the body via additive manufacturing so that the plurality of antenna structures are electrically connected to the back surface via the electrical traces and/or passive electrical filter components, as shown at block 735.

In some embodiments, the method may comprise forming at least one cavity filter into the body via additive manufacturing, as shown at block 740. The method may comprise forming at least one heat pipe integrated into the body via additive manufacturing, and/or forming at least one cooling fin structure integrated into the body via additive manufacturing, as shown at blocks 750 and 760. In various embodiments, the method may comprise mounting one or more radio application-specific integrated circuits (ASICs) on the back surface of the body, as shown at block 770.

The above description provides specific examples and illustrations, which are not intended to limit the applicability of the inventive techniques and apparatuses described herein. An important aspect of several embodiments of these techniques and apparatuses is the use of an additive manufacturing technique to form a semi-convex shape to be used as a substrate for antenna elements, while allowing for mounting of surface component on its flat backside. This improves antenna coverage, and also allows for the integration of radio front-end filters and cooling during manufacturing of the structure.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. An antenna apparatus, comprising:
   an additively manufactured body having a back surface with one or more flat regions and a substantially convex front surface opposite the back surface; and
   one or more of one or more of the following:
      a radiative antenna element attached to the front surface;
      a radiative antenna element integrated into or near the front surface via additive manufacturing;
      a passive electrical filter component integrated into the body via additive manufacturing; and
      an electrically conductive trace integrated into the body via additive manufacturing and arranged to provide an electrical connection from the back surface of the body to the front surface of the body or to a passive electrical filter component integrated into the body.

2. The antenna apparatus of claim 1, wherein the front surface is curved in one plane, so as to have a semi-cylindrical shape.

3. The antenna apparatus of claim 1, wherein the front surface is curved in two orthogonal planes, so as to have a semi-spheroidal shape.

4. The antenna apparatus of claim 1, comprising a plurality of antenna structures affixed to or integrated into or near the front surface, the antenna structures being arranged so as to collectively provide a radiation pattern having a 3-dB beamwidth greater than 120 degrees in at least one plane orthogonal to the back surface.

5. The antenna apparatus of claim 4, wherein the plurality of antenna structures is electrically connected to the back surface via electrical traces and/or passive electrical filter components integrated into the body via additive manufacturing.

6. The antenna apparatus of claim 1, comprising at least one cavity filter integrated into the body via additive manufacturing.

7. The antenna apparatus of claim 1, further comprising at least one heat pipe integrated into the body via additive manufacturing and configured to allow flow of liquid cooling through the body.

8. The antenna apparatus of claim 1, further comprising at least one cooling fin structure integrated into the body via additive manufacturing.

9. The antenna apparatus of claim 1, further comprising one or more radio application-specific integrated circuits (ASICs) mounted on the back surface of the body.

10. A circuit board assembly comprising a circuit board and mounted thereon at least one antenna apparatus according to claim 1.

11. A method for constructing an antenna apparatus, wherein the method comprises:
    additively manufacturing a body having a back surface with one or more flat regions and a substantially convex front surface opposite the back surface; and
    forming, while additively manufacturing the body, one or more of one or more of the following:
       a radiative antenna element integrated into or near the front surface via additive manufacturing;
       a passive electrical filter component integrated into the body via additive manufacturing; and
       an electrically conductive trace integrated into the body via additive manufacturing and arranged to provide an electrical connection from the back surface of the body to the front surface of the body or to a passive electrical filter component integrated into the body.

12. The method of claim 11, wherein additively manufacturing the body comprises forming the front surface to be curved in one plane, so as to have a semi-cylindrical shape.

13. The method of claim 11, wherein additively manufacturing the body comprises forming the front surface to be curved in two orthogonal planes, so as to have a semi-spheroidal shape.

14. The method of claim 11, comprising affixing a plurality of antenna structures to the front surface or integrating a plurality of antenna structures into or near the front surface via additive manufacturing, so that the antenna structures are arranged so as to collectively provide a radiation pattern having a 3-dB beamwidth greater than 120 degrees in at least one plane orthogonal to the back surface.

15. The method of claim 14, comprising forming electrical traces and/or passive electrical filter components integrated into the body via additive manufacturing so that the plurality of antenna structures are electrically connected to the back surface via the electrical traces and/or passive electrical filter components.

16. The method of claim 11, comprising forming at least one cavity filter into the body via additive manufacturing.

17. The method of claim 11, further comprising forming at least one heat pipe integrated into the body via additive manufacturing.

18. The method of claim 11, further comprising forming at least one cooling fin structure integrated into the body via additive manufacturing.

19. The method of claim 11, further comprising mounting one or more radio application-specific integrated circuits (ASICs) on the back surface of the body.

* * * * *